July 3, 1962 A. H. WEIL, SR., ET AL 3,042,440
POST HOLE DIGGER
Filed March 17, 1959
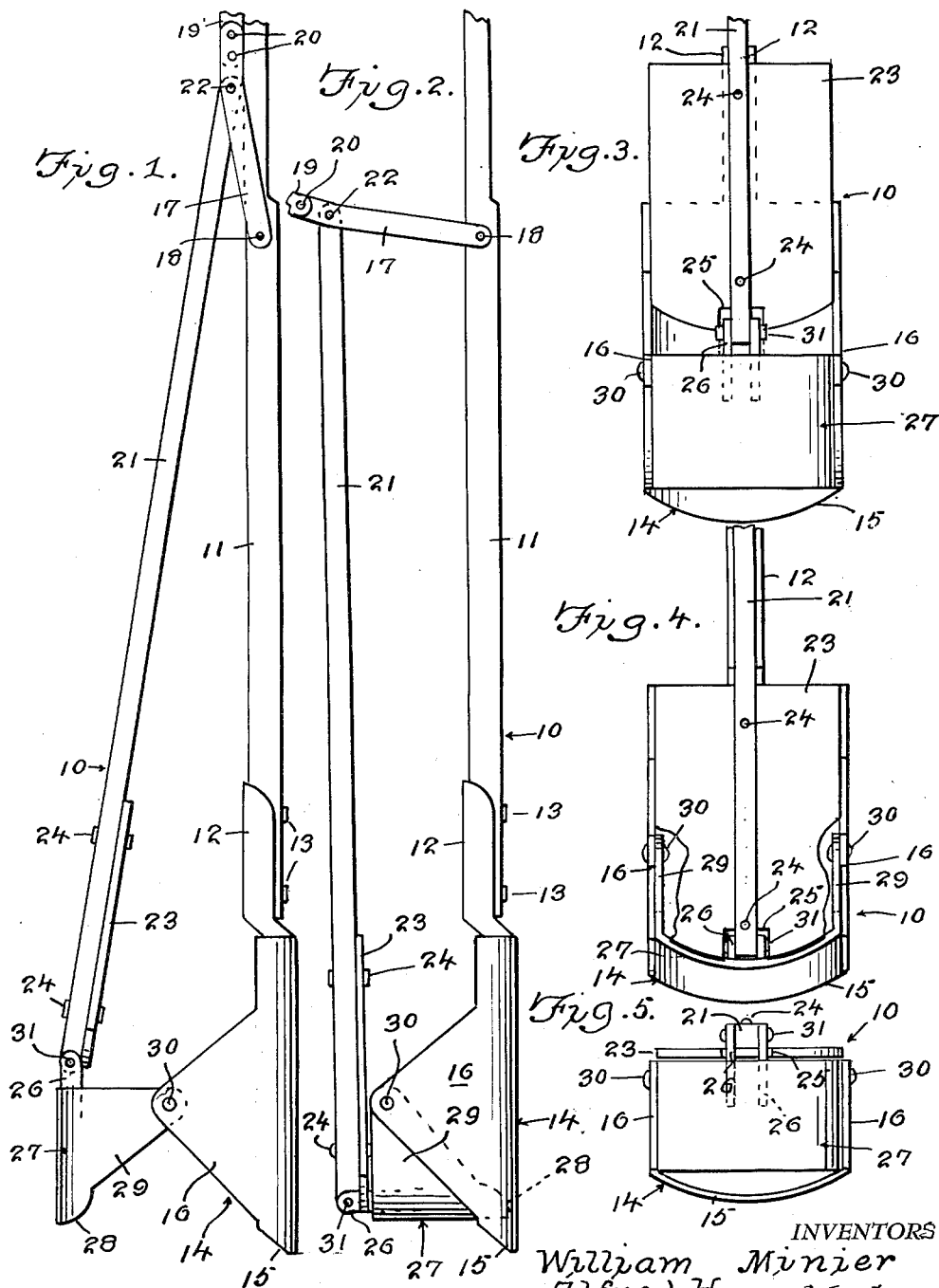
INVENTORS
William Minier
Alfred Henry Weil, Sr.
BY Victor J. Evans & Co.
ATTORNEYS

United States Patent Office 3,042,440
Patented July 3, 1962

3,042,440
POST HOLE DIGGER
Alfred Henry Weil, Sr., 3014 E. Crawford Ave., St. Francis, Wis., and William Minier, Rte. 2, Bradford, Ill.
Filed Mar. 17, 1959, Ser. No. 800,022
1 Claim. (Cl. 294—50.9)

This invention relates to a post hole digger.

The object of the invention is to provide a tool which is adapted to be used for digging holes in the ground, as for example when such holes are to be used for receiving posts or the like.

Another object of the invention is to provide a post hole digger which is adapted to be manually actuated whereby the dirt can be readily shoveled out of the ground so that the holes can be formed quickly and easily.

A further object of the invention is to provide a post hole digger which is extremely simple and inexpensive to manufacture.

Other objects and advantages will be apparent during the course of the following description.

In the accompanying drawings, forming a part of this application, and in which like numerals are used to designate like parts throughout the same:

FIGURE 1 is a fragmentary elevational view of the post hole digger of the present invention, showing the parts in open position.

FIGURE 2 is a view similar to FIGURE 1 but showing the parts in closed position.

FIGURE 3 is a fragmentary elevational view showing the parts in the position of FIGURE 1, but taken at right angles thereto.

FIGURE 4 is a view similar to FIGURE 3, but showing the parts in the closed position of FIGURE 2.

FIGURE 5 is a bottom plan view of the post hole digger of the present invention, with the parts in the closed position of FIGURE 2.

Referring in detail to the drawings, the numeral 10 indicates the post hole digger of the present invention which is shown to comprise an upright bar 11 that has a shank 12 secured to its lower end in any suitable manner, as for example by means of securing elements 13. The numeral 14 indicates a semi-cylindrical shovel which is secured to the shank 12 or formed integral therewith, and the shovel 14 arranged in a vertical position adjacent the lower end of the bar 11 and secured to the shank 12. The shovel 14 has on its lower end a curved cutting edge 15 and is provided with spaced parallel triangular shaped ears 16, FIGURE 1.

The numeral 17 indicates each of a pair of links which are pivotally connected to the bar 11 as at 18. A handle 19 is secured to the links 17 by securing elements 20.

The numeral 21 indicates a lever that has its upper end pivotally connected to the links 17 by means of a pivot pin 22. An upright plate 23 is fixedly secured by securing elements 24 to the portion of the lever 21 adjacent to and spaced from the lower end thereof and is provided in its lower portion with a cutout or slot 25. The numeral 26 designates each of a pair of lugs which are pivotally connected to the lower end of the lever 21 by means of a pivot pin 31. A semi-cylindrical scoop 27 is arranged in face to face spaced relation with respect to the shovel 14 and is provided on its lower end with a curved cutting edge 28 conformably shaped to abut against the adjacent face of the shovel 14 when the scoop 27 is moved to a horizontal position, as shown in FIGURE 2. Adjacent the upper end of the scoop 27 are substantially triangular shaped ears 29. Pivot pins 30 connect the scoop ears 29 to the ears 16 of the shovel 14 for movement of the scoop 27 from the upright position to the horizontal position. When the scoop 27 is in the upright position, the lower end of the scoop 27 is adjacent to and spaced above the cutting edge 15 of the shovel 14. When the scoop 27 is in the horizontal position, the cutting edge 28 of the scoop 27 is wholly within the shovel 14 and abuts against the adjacent shovel face. The handle 19, links 17, and associated pivot elements or pins 18, 22, 30, and 31, constitute hand actuable means operable to effect movement of the scoop 27 from the upright position to the horizontal position in which the plate 23 constitutes means operatively connected to the hand actuable means for closing the end of the scoop 27 remote from the shovel 14. The scoop 27 further includes substantially triangularly shaped ears 29. The ears 29 of the scoop 27 are pivotally connected to the ears 16 of the shovel 14 by means of pivot pins 30.

From the foregoing, it is apparent that there has been provided a post hole digger and in use when a hole in the ground is to be dug or formed, the parts are initially arranged as shown in FIGURE 1 for example. Then, the digger 10 is moved downwardly into engagement with the ground, and the lower edges 28 and 15 of the scoop 27 and shovel 14 respectively will cut through the ground. Then, the handle 19 is moved from the position shown in FIGURE 1 to the position shown in FIGURE 2 and this movement of the handle 19 away from the bar 11 causes the scoop 27 to move from the position shown in FIGURE 1 to the position shown in FIGURE 2. Then, by lifting up on the digger 10 the dirt held above the scoop 27 and between the shovel 14 and plate 23 can be readily removed from the hole being formed. To empty the digger, it is only necessary to return the handle 19 from the position shown in FIGURE 2 to the position shown in FIGURE 1 whereby the dirt will drop off of the scoop 27. This cycle of operation is of course repeated until the hole of the desired formation or depth is formed or provided.

The plate 23 performs a very valuable function since it acts as a means of preventing the dirt from falling off the back of the scoop 27 so that the plate 23 and scoop 27 and shovel 14 coact to define an enclosure when the parts are in the position shown in FIGURE 2 whereby the dirt can be readily removed from the hole. Furthermore, the ears 29 and 16 have a substantially triangular shape so that when the parts are in the position shown in FIGURE 2 there will be no accidental loss of dirt between the scoop and shovel.

The lower portion of the plate 23 is provided with the cutout 25 which provides sufficient clearance for the lugs 26 as for example when the lugs 26 move from the position shown in FIGURE 1 to the position shown in FIGURE 2.

The parts can be made of any suitable material and in different shapes or sizes.

The parts are arranged or constructed so that a highly efficient cutting action is provided and wherein the dirt will not stick to the blade so that the operator can readily remove all of the loose material from the hole each time the digger is dumped. The plate 23 permits the operator to dig holes in any kind of soil, sand, gravel, cinders or the like whether they may be wet or dry, and it also greatly increases the capacity of the digger.

Minor changes in shape, size and rearrangement of details coming within the field of invention claimed may be resorted to in actual practice, if desired.

We claim:

In a post hole digger including an upright bar, a semi-cylindrical shovel arranged in a vertical position adjacent the lower end of said bar and connected thereto, said shovel being provided with a cutting edge on the lower end thereof, an upright lever disposed adjacent said bar, a semi-cylindrical scoop arranged in face to face relation with respect to said shovel and having the upper end thereof connected to said lever for pivotal movement relative to said lever, the lower end of said scoop being provided with a curved cutting edge, the lower end of said scoop being adjacent to and spaced above the cutting edge of said shovel, means connecting said scoop to said shovel for pivotal movement from the face to face position to a position in which said scoop is horizontal and has the curved cutting edge thereof wholly within said shovel and abutting the adjacent face of said shovel, and a handle operatively connected to the upper end of said lever and to said bar for effecting the movement of said scoop, the improvement consisting in an upright plate carried by said lever operable to close the end of said scoop remote from said shovel when said scoop has been moved to the horizontal position to thereby prevent spilling of dirt from said scoop, said plate being free of and spaced above the upper end of said scoop when the scoop is in the face to face position with respect to said shovel so as to facilitate free entry into said scoop of dirt as loosened by said scoop and shovel cutting edges responsive to a downward digging force applied to said bar.

References Cited in the file of this patent

UNITED STATES PATENTS

| | | |
|---|---|---|
| 226,118 | Scheidler | Mar. 30, 1880 |
| 815,133 | Van DeWalker et al. | Mar. 13, 1906 |
| 819,791 | Neste | May 8, 1906 |
| 1,407,232 | Stevens | Feb. 21, 1922 |
| 2,132,795 | Minier | Oct. 11, 1938 |
| 2,196,116 | Johnson | Apr. 2, 1940 |

FOREIGN PATENTS

| | | |
|---|---|---|
| 49,583 | Germany | Dec. 8, 1889 |
| 560,436 | Great Britain | Apr. 4, 1944 |